United States Patent [19]

Motoyama

[11] Patent Number: 5,325,484
[45] Date of Patent: Jun. 28, 1994

[54] METHOD AND SYSTEM TO HANDLE INCLUSION OF EXTERNAL FILES INTO A DOCUMENT PROCESSING LANGUAGE

[75] Inventor: Tetsuo Motoyama, San Jose, Calif.

[73] Assignees: Ricoh Company, Ltd., Tokyo, Japan; Ricoh Corporation, San Jose, Calif.

[21] Appl. No.: 876,251

[22] Filed: Apr. 30, 1992

[51] Int. Cl.$^5$ .............................................. G06F 15/20
[52] U.S. Cl. ..................................... 395/162; 395/101
[58] Field of Search ....................... 395/101, 115-117, 395/145, 147, 148, 162, 164-166; 340/723, 747; 364/200 MS File, 900 MS File

[56] References Cited

U.S. PATENT DOCUMENTS 4,649,513  3/1987  Martin et al. .................... 364/900
4,870,611  9/1989  Martin et al. .................... 364/900

OTHER PUBLICATIONS

"InterPress, The Source Book" by Harrington et al (Simon and Schuster, Inc., 1988).
"PostScript Language Reference Manual", Addison-Wesley Publishing Co. Second Edition, 1991.
ISO/IEC DIS 10180, Information Processing-Text Communication-Standard Page Description Language; Draft International Standard 1991-03, 1991.

*Primary Examiner*—Dale M. Shaw
*Assistant Examiner*—Kee M. Tung

*Attorney, Agent, or Firm*—Oblon, Spivak, McClelland, Maier & Neustadt

[57] ABSTRACT

An apparatus for controlling printing or display of documents represented in a structured hierarchal page description language. Documents are provided as a document data stream which can include references to external references and external data declarations which can be incorporated into the document by the content processor. Documents are defined by a prologue section which may contain definitions and declaratory commands, with content portions containing specific tokens or command for specific images. The document data stream has a hierarchal structure. A means to provide external declarations is provided which will process external declarations as if the external declaration which can be stored on a separate device were part of the original document data structure. The storage of the references to the external declarations is accomplished in a tree linked stack structure with a last in first out arrangement which allows for a faster search order of external declarations. The tree linked stack structure further allows for the correct external declaration to be associated with a given reference thereto, even if different external declarations within the document data stream might have the same name. The context of the document data stream and the level in which a call is made determines the exact external declaration which is being referenced. This provides an incorporation by reference ability to a document data stream.

16 Claims, 8 Drawing Sheets

PICTURE/PROLOGUE STACK

PROLOGUE DATA STRUCTURE

1 ○ ─────────────► Null
External Declaration Data Structure

External Declaration Data Structure

METHOD AND SYSTEM TO HANDLE INCLUSION OF EXTERNAL FILES INTO A DOCUMENT PROCESSING LANGUAGE

BACKGROUND OF THE INVENTION

1. Field of the Invention

This invention relates generally to computer controlled printing of documents having text and graphical components and more particularly to a method and system for inclusion of external files, represented in a structured page description language, into a data stream intended to be printed or displayed. It is particularly useful for the automatic translation between different data and printing formats which are suitable for use with a variety of presentation devices and/or for the transmission of data to other devices in a communication system. In this context the presentation of a document on a page involves the printing on a fixed medium such as paper, transparency or the like, a page, or presenting on a visual display a page or transmitting to another device the document in a form to be presented or stored. The present application is related to commonly owned co-pending U.S. patent application Ser. No. 07/778,578 filed on Oct. 17, 1991, the disclosure of which is incorporated by reference herein. The present application is also related to commonly owned concurrently filed U.S. patent application Ser. No. 07/876,601 entitled "A Method and Apparatus to Manage Picture and Pageset for Document Processing" filed on Apr. 30, 1992, also incorporated by reference herein.

2. Discussion of the Background

The development of laser printers in the early 1970s provided an opportunity for high quality low cost printing of documents which contain not only character text but also general graphical material. The primary method of controlling commands by the computer to the printer employed the so called "escape sequence" commands similar the type commands used in the DIABLO ® command sequence. These types of commands were distinguished from typical character data by preceding each command with a special byte, generally an escape character (ASCII 27). This methodology worked in an acceptable manner with daisy wheel or dot matrix printers but is not well suited for printing documents that combine both text and graphical materials in that no provision is made for the large amount of data that a graphic might need. It also does not allow for the inclusion of external files into a data stream in an expeditious manner.

As a response to the limitations inherent in the case of the escape sequence commands, different types of "page description language" (PDL) were developed generally to control laser printers or other types of page printers. Backward compatibility was provided to most of these laser printers in that they were generally able to accept escape sequence commands. Examples of page description language are the PostScript ® system from Adobe Systems Incorporated and InterPress ® from Xerox ® Corporation. Several other proprietary PDL's are also known.

The prior art page description languages provided various improvements to the standard escape sequences known previously, such as providing tools and syntax for resource declarations, context declarations, dictionaries, the use of memory stacks or the like. These languages also in some cases allowed for dynamic changes in the printers state, such as the ability to add fonts or to add graphical images to the resources that might be available to the printer. Some of these features are documented in such generally available reference works as Adobe System Incorporated's "PostScript Language Reference Manual" and the "PostScript Language Program Design", both by Addison-Wesley Publishing Company. Other PDL's are likewise described in various technical and reference books such as "InterPress, The Source Book" by Harrington et. al. (Simon and Schuster, Inc., 1988)

A standardized page description language has been proposed and is in the process of being developed as an international standard. The proposal, to which the present inventor is a contributor, at this stage is in draft form before a section of the ISO. The draft is known as ISO/IEC DIS 10180 and is labeled "Information Processing- Text Communication- Standard Page Description Language". The current draft is dated 1991.

Many of the prior art types of page description languages suffer from various flaws, including the fact that they are generally limited to an individual page and are do not generally employ a fully structured language. For example, one of the shortcomings of the PostScript ® language is that the page description for a particular document can contain a new definition such as a resource definition (for example an additional font) or a new dictionary definition which can be used anywhere in the document. As a result of this, the entire content of the document must be processed in order to determine whether a particular printer has the resources that are necessary to print it. Alternatively, if this "pre-processing" is not performed it is possible that the printing of a document may fail at any point during the printing process, even at the very end, due to the inability of the printer to comply with commands of the document page description.

Additional problems are associated with the prior art systems that employ PostScript ® in that in order to print a given page of a document it is generally necessary to read at the beginning of each page the entire PDL description of all the preceding pages of the document in order to determine the state of the document page setup parameters (i.e., resource declarations, dictionary definitions or the like). In other words, a print control or print drive program must read the entire PDL description of a document to take into account the effect of every page setup command between the beginning of the document and the specified page. While this page setup scanning process is relatively straightforward it does require a significant amount of processor time which can be better used by the printer.

Additionally there is no syntax or semantics defined in the PostScript ® language to handle the inclusion of external entities, nor is there any easy method to add this feature.

One of the problems with the well known InterPress ® system from Xerox ® is that its structure does not allow for both "clear text" or binary data streams to be used interchangeably.

The ability to add external entities to a document data stream allows for a "global" type of change to be provided in documents whereby a library of "style" standardizations can be easily created so that standardized or set styles can be defined for work groups, departments or enterprise-wide operations.

SUMMARY OF THE INVENTION

Accordingly, one object of this invention to provide a method and apparatus for the inclusion of external declarations in an expeditious manner.

The inclusion of external entities or declarations is important in providing increased flexibility for a document description language or the data stream that describes a document when it is being printed. Specifically, as changes in the nature of the document preparation occur or as new facilities become available for individual printing devices or the like, such as finishers, staplers or other types of items which were not contemplated when the original definition of the language was created, the inclusion of external declarations adds flexibility. The inclusion of external entities in the present invention allows the printing device or the display device to add and to use these new features and to include the use of these features in a document data stream without the necessity of redefining the language. This increases the flexibility of the system and allows for a far greater use of resources without the planned obsolescence that is present in most prior art systems.

It is another object of this invention to provide a means by which document data streams may be modified by the use of external data declarations in a manner which can be processed efficiently.

It is yet another object of this invention to provide an apparatus and methodology for altering data streams which are used, or intended to be used, for the printing of a document with external data declarations in a structured approach.

It is yet another object of this invention to provide an apparatus and methodology for adding capabilities to a printer by use of external declarations in a structured environment.

These and other objects are achieved according to the present invention by providing a new and improved apparatus for controlling the presentation of documents represented in a document descriptive language form. External entities such as graphics or other data streams (which might be other complete documents) can be added to a document data stream so that the definition and declaratory commands associated with the external entities are easily processed. These external documents or entities are also structured. According to the invention, this is accomplished by providing each document data stream with zero or more prologue sections which contains definitions and declaratory commands, and content portions which contain specific tokens or commands for defining specific images. The prologue sections and content portions are arranged in a tree-linked hierarchy. This hierarchy allows for external declarations, with the most recently entered external declaration occupying higher positions in the hierarchy in relation to earlier entered declarations.

The tree-linked hierarchy provides an important advantage in this invention in that any external entity or any other portion of the document may be processed or printed without having to process any other portion of the document. Only structural definitions in the hierarchial tree which are above a selected portion of a document need be processed. That is to say if, for example, page three of a twenty page document need be processed, only page three and the attendant declarations that are at page three's level or above in the hierarchial tree need be processed. This increases the efficiency and also facilitates the determination of the level of resource needed by a document prior to the commencement of the actual printing of the document. With respect to external declarations this provides significant improvements in the speed of processing and also requires only the processing of those external declarations that are necessary.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE DRAWINGS

Figure 1:
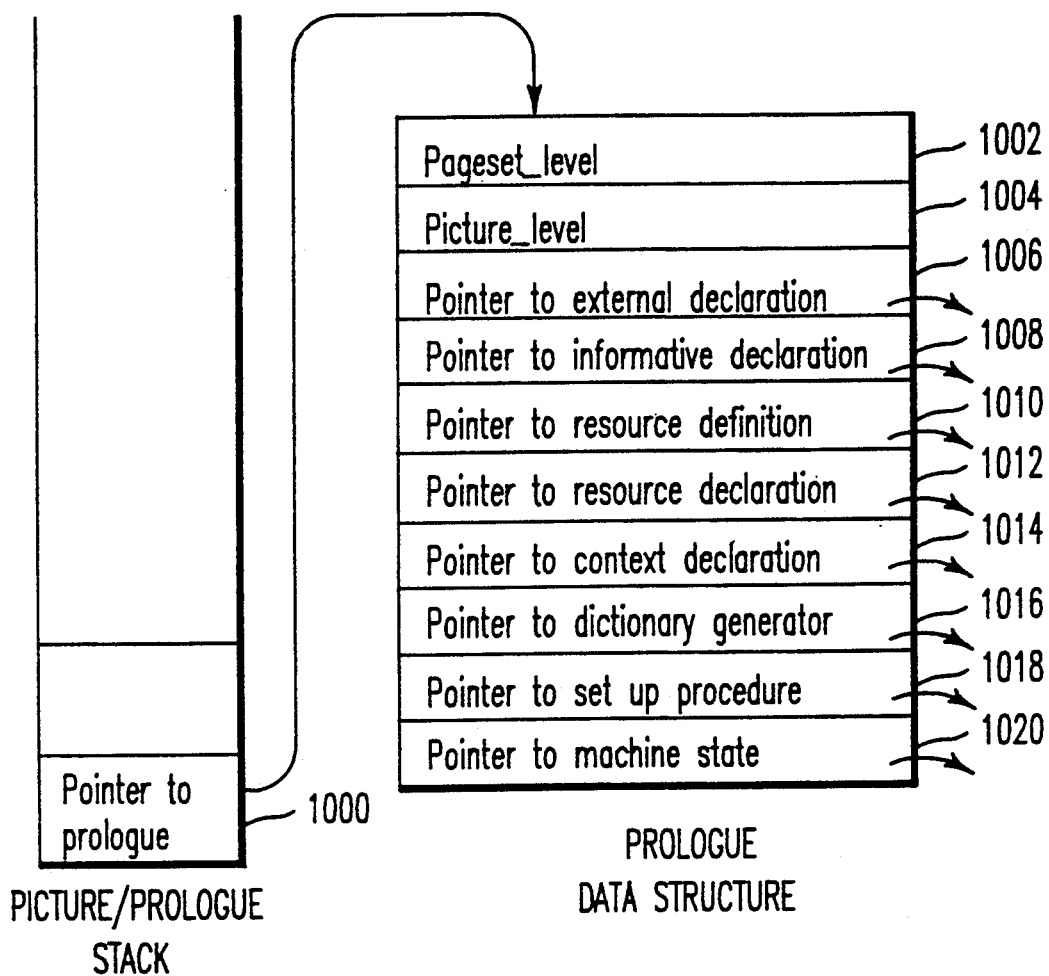
FIG. 1 is an illustration of a stack arrangement which keeps track of a picture and pageset of a document represented in the structured Standard Page Description Language form of this invention.

Referring now to FIG. 1 the picture and page stack of this invention are illustrated. A stack arrangement is used in which a pointer to a "prologue" 1000 provides the information necessary to add an external declaration to a given document description. The given pageset level is defined in item 1002. A given picture level assigned to a given prologue is set in 1004. A series of pointers 1006, 1008, 1010, 1012, 1014, 1016, 1018 and 1020 are used as pointers to the various items such as the external declaration, an informal declaration, a pointer to a resource definition, a pointer to a resource declaration, a pointer to a context declaration, a pointer to dictionary generator and a pointer to a setup procedure and a pointer to the machine state respectively. A document description comes from the structured portion of a document data stream. A search trail through the document data stream is set up based upon the additional "subpointers" 1006 thru 1020 which are established. The search trail proceeds from the first pointer in the initial prologue to any external declaration 1006, the informative declaration 1008, the resource definition 1010, the resource declaration 1012, the context declaration 1014, the dictionary generator 1016, the set up procedure 1018 and to the machine state 1020.

Figure 8:
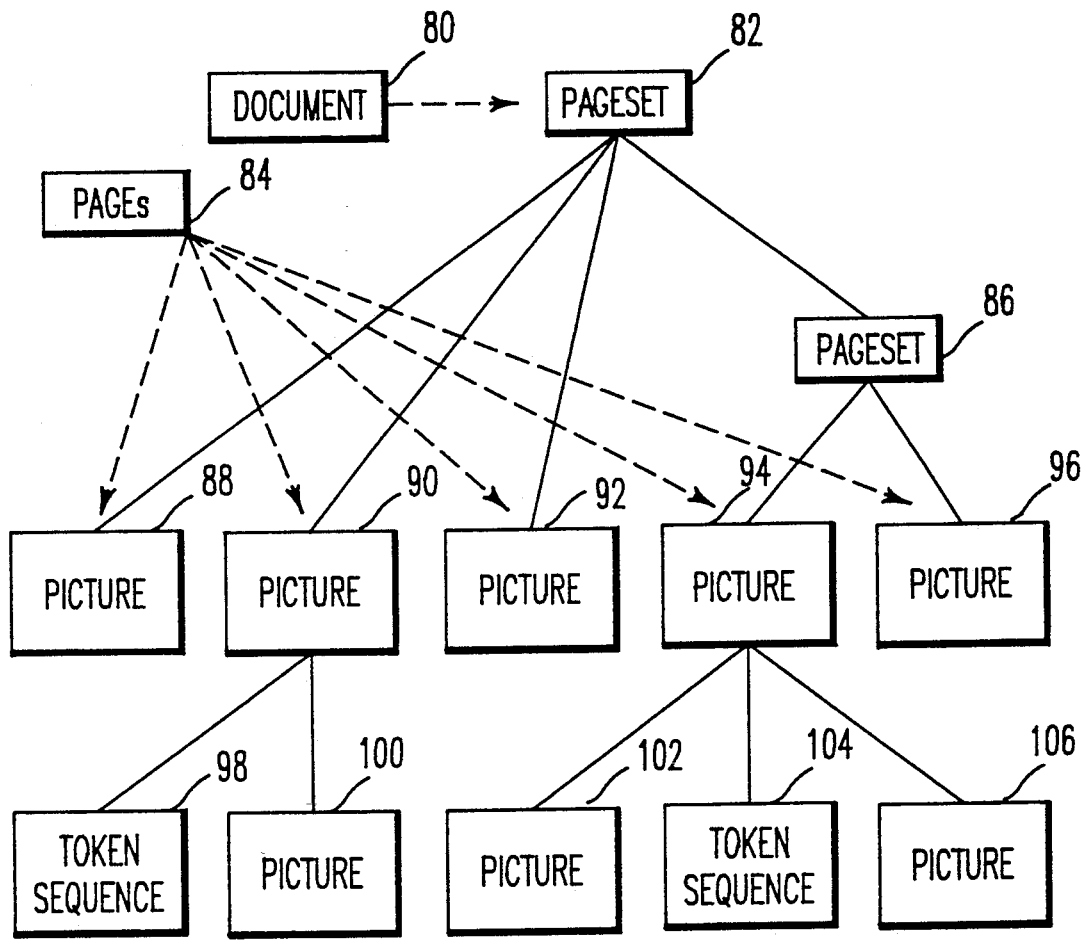
FIG. 8 is a block diagram of an example of a SPDL document structure according to this invention.

FIG. 8 is illustrative of the arrangement of a conventional SPDL document, as would be used or processed by this invention. It should be noted at this juncture that the basic structure of the document data stream is as set forth in the aforementioned proposed ISO standard. Each document contains a document description which will have both structure elements and content elements. The document structure and its related elements are independent of the content of the document and may be processed independently of the content of a document. The content is in the form of a page description language. Its processing is dependent upon the document structure, its elements and the context in which it occurs.

When structure processing is for the purpose of presentation, the structure processing establishes the context of interpretation of each element of document content. It should be noted that when structure processing is for purposes other than document presentation there is usually no need to perform content processing. The presentation process may also have available to it various sources of additional data such as fonts stored in portions of and external SPDL documents which may be referenced by the SPDL document which is being processed. The sum of all such data is referred to as the environment of the presentation process.

The SPDL document structure is a result of the division and repeated subdivision of an SPDL document into increasingly smaller parts. Each of these resulting parts is called a structure element.

The SPDL document structure is hierarchical in nature. The highest level is a document 80. A document may contain subordinate structure elements which are called pageset 82 or picture structure elements.

A pageset 82 may in turn contain subordinate pagesets and/or pictures. Each picture contains a description of the document. The highest level of picture in the picture hierarchy is a page presented on a single instance of the presentation medium (i.e. a single page for example).

A picture may contain subordinate structure elements called picture 88-96, and/or tokensequence structure elements. A tokensequence is a structure element which contains document contents.

A document is simply a pageset or a picture which at the highest level in the structure hierarchy. Similarly a page is simply a picture which is at the highest level in the picture hierarchy.

In this context, the term pointer and subpointer refer to the conventional data structure concept of providing information as a data entry not the data itself. That is to say the pointers are data pointing to a given memory location or to another pointer which points to the location of the actual data or to the actual data itself. Of course this definition should be understood to be recursive in nature. Further it should be understood for the purposes of this discussion that resources, dictionary and external definitions are similar in function to the resource and dictionary definitions which are found in the PostScript ® page description language. Resource declarations and definitions are generally directed to such items as fonts, filters, fill patterns, colors, glyphs or the like and may be available by invoking a token within the data stream provided to the printer or resource device. Resource declarations bind a name to a specified resource, while resource definitions supply the exact nature of each resource. Dictionaries are used to translate key values into given lists of tokens or other values and may be considered to be similar to a macro definition. An external definition references a subset of structure elements which are external to a given document and do not have a true one-to-one relationship to anything in the PostScript ® language.

An external entity might, for example, be a graphic or an image, in terms of tokensequence structure element, which is separate from the document but which is automatically picked up during the processing of the document. It may be, by way of a further example, a picture structure element or other type of graphical tokensequence structure element which is to be included, as for example, a header or footer to every page. It may also be another structure element data stream and therefore the definition allows recursion of the structured elements. However, as external declarations may change based upon the processing that occurs, it is necessary for processing to occur at a given printing or display device so that the external entity can be prepared for presentation to the user. It is important to have the ability to add or to change external entities "on the fly". This is accomplished by the pointer structure shown in FIG. 2.

Figure 2:
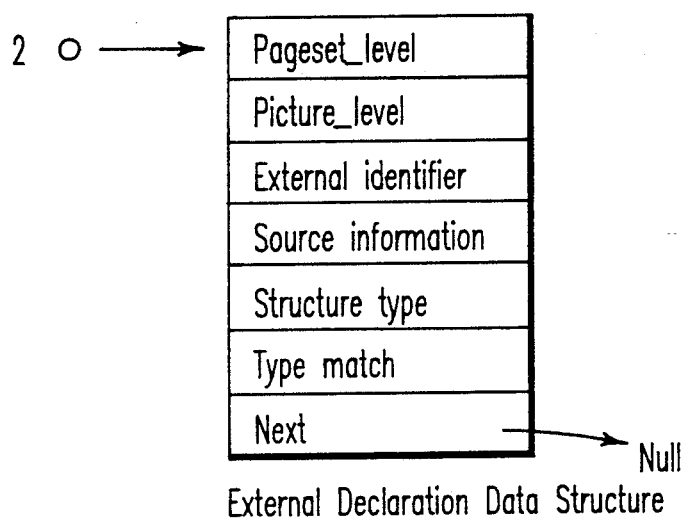
FIG. 2 is an illustration of steps in the pointer method of adding external entities to the data structure shown in FIG. 1.
Figure 2:
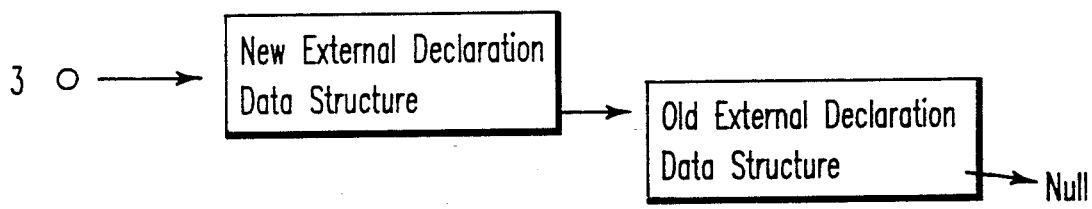

Specifically, the pointer and method shown in FIG. 2 implements a pointer to the external declaration which is shown in the prologue data structure shown in FIG. 1. Initially this pointer points to a "null" before any external declaration is encountered. This is intuitive in that when a document data stream is first encountered in the processing, it may be without any external entities and therefore no external declaration(s) will be present and consequently the value of the pointer will be to a "null" value. When an external declaration is encountered, the memory necessary for an external declaration data structure is allocated at the printing or display device. This pointer is then changed from a null value to the address of the allocated memory for the external declaration data structure. The item that is labelled next in the external data structure will then point to null, as only a single external declaration data structure is present. Other entries in the external data structures are processed as they are encountered in a similar manner with the prior pointer being changed to point to the newly allocated area and the pointer in the newly allocated area being set to point to the previously first external entity as shown in FIG. 2.

These external declaration data structures are processed in the manner set forth in FIGS. 4 and 5, discussed below. When other external declarations are encountered in a document, they are placed in front of the old external declaration with the pointers being changed accordingly. In other words, as they are processed, new external declarations are assigned a higher hierarchal position than previously processed external declarations. Consequently, the latest external declaration will always be first in a search order with the "type match" keeping track of information whether or not the external entity is correctly defined.

Figure 3:
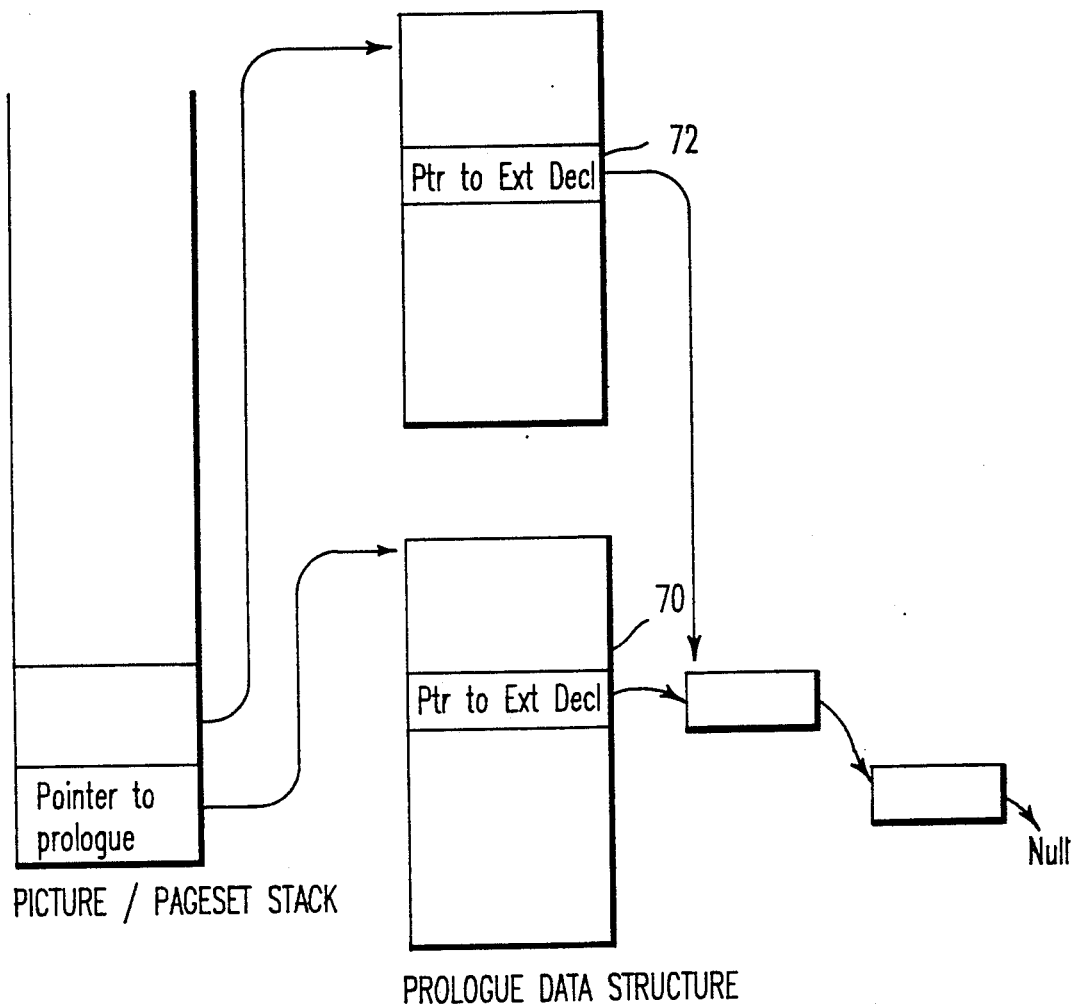
FIG. 3 is an illustration of the processing of a second picture or pageset.

FIG. 3 shows the pointer when an additional entry of the PICTURE/PAGESET stack is made. The additional entry points to a new PROLOGUE DATA STRUCTURE. The external declaration of this new data structure points to the same location as the location pointed by the external declaration of PROLOGUE DATA STRUCTURE pointed by the entry below in the PICTURE/PAGESET STACK.

The processing of the second picture or pageset can be accomplished. As shown in FIG. 3, a pointer which points to an address of an external declaration of a prologue data structure. This pointer identifies and locates the address to the external declaration of a prologue data structure which is pointed to by any subsequent entity in the picture/pageset stack that references this external entity. By implementing this picture pageset arrangement, by use of a stack, the data structures will be in order. As shown in FIG. 3, even if one of the lower prologue data structures has multiple pointers, (for example, the pointer to the external declaration 70 has multiple external declarations), the pointer 72 will point to the most recent external declaration even though prior external declarations have been set forth for the external declaration 70. This occurs because of the requirement that external declarations which are most recently added are placed in front of previously input external declarations. Consequently, the latest external declaration will always be searched first in the search order, thereby reducing the amount of processor time that is necessary for searching of additional external declarations.

As the level or scope in the hierarchy of an external declaration to be added to an ordered data stream is set in the ordered data stream, an external structure element may be lexically included by reference, as if it were placed into the document data stream in toto by placing the external identifier into the structure at any position where a corresponding external element would be acceptable. This external declaration is added and would be identified by the value of the structure identifier therein. The structure processor which is discussed below will resolve any references to external identifiers by substituting the external structure element for the external identifier.

Each external declaration will bind an external identifier to an external structure element. An external declaration, as defined by the Draft ISO standard, is a composite structure which has several immediate subordinates such as an external identifier structure element, a structure type identifier structure element, and a structure identifier structure element. The structure elements occur in a specified order. Any external identifier which has been declared in an external declaration is capable of being used anywhere in the document structure where a structure element of the type specified by the external declaration would be a valid type.

The effect of the occurrence of an external identifier in a structure element which is within the scope of an external declaration in which the external identifier has been bound to the external structure element will cause this external declaration to act as a replacement for the replaced external identifier. The structure processor which is discussed below will resolve any references to the external declarations by substituting the "correct" external structure element for the external identifier that is at the proper level in the hierarchy. The external structure element is then processed by the structure processor as though it had been a part of original SPDL document data stream. In this manner, as far as the final processing occurs, once an external entity has been "bound" by way of the external declaration, it is capable of being used in the same manner as if it were part of the original document without any additional processing being necessary.

Figure 4:
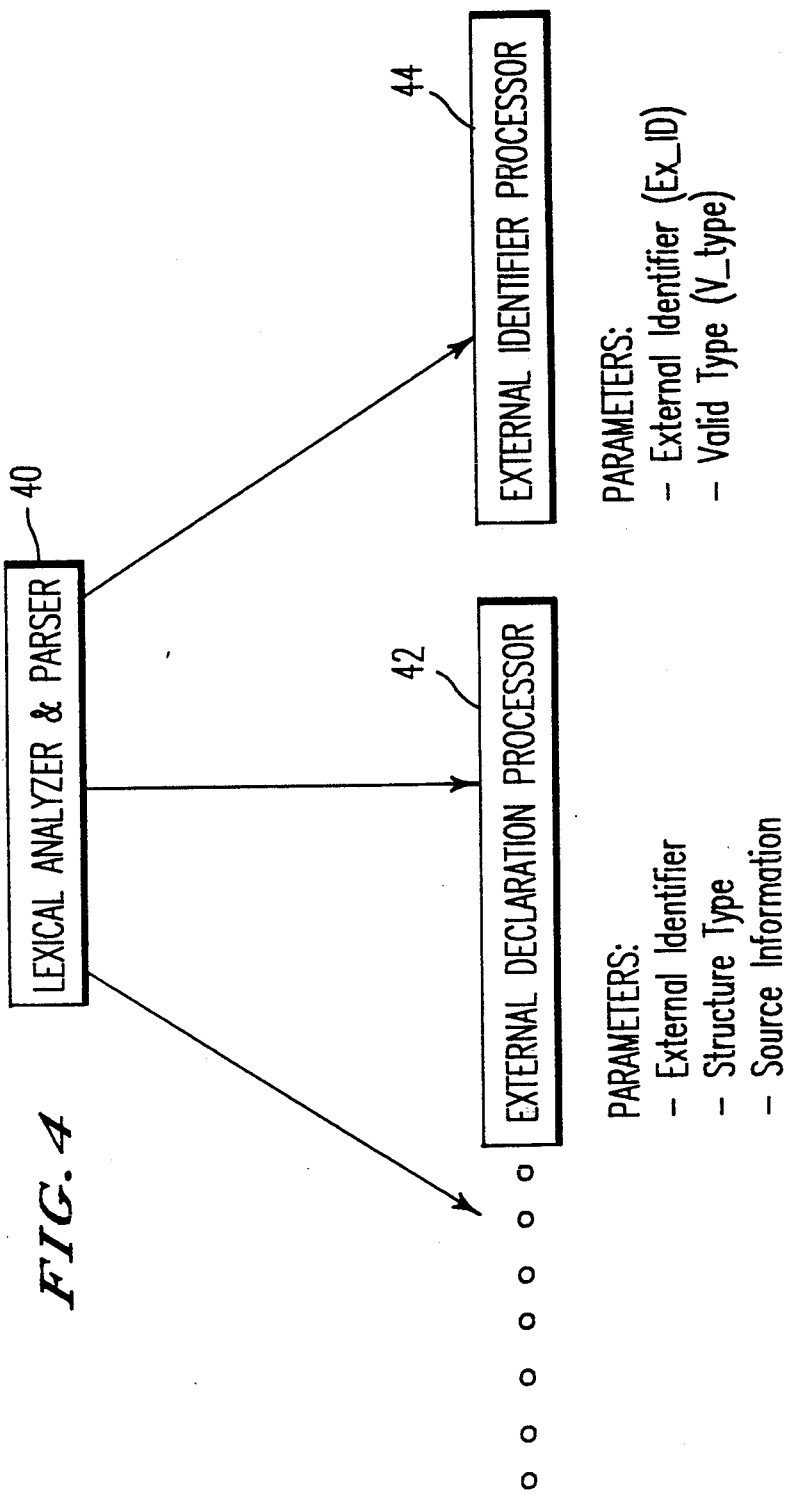
FIG. 4 is a schematic illustration of the interconnection between two processors which process the external declaration and external identifier in a SPDL document according to one application of this invention to a lexical analyzer and parser.

As shown in FIG. 4 a Lexical Analyzer and Parser 40 used in this invention calls for logically separate multiple processors. However for the purpose of this disclosure, only the external declaration processor 42 and the external identified processor 44 are relevant. As noted in the example as shown in FIG. 8, the external identifier is used during the declaration phase and identifies the place where the inclusion of an external reference is placed. The two processors may be implemented either as individual circuits or as part of a generic SPDL processor. The processors determine based on an inputted data document stream the parameters which are passed by these to processors to the next stage in the presentation processing. The external declaration processor will be explained in more detail with respect to FIG. 5 and the external identifier processor will be explained in more detail with respect to FIG. 6.

Figure 5:
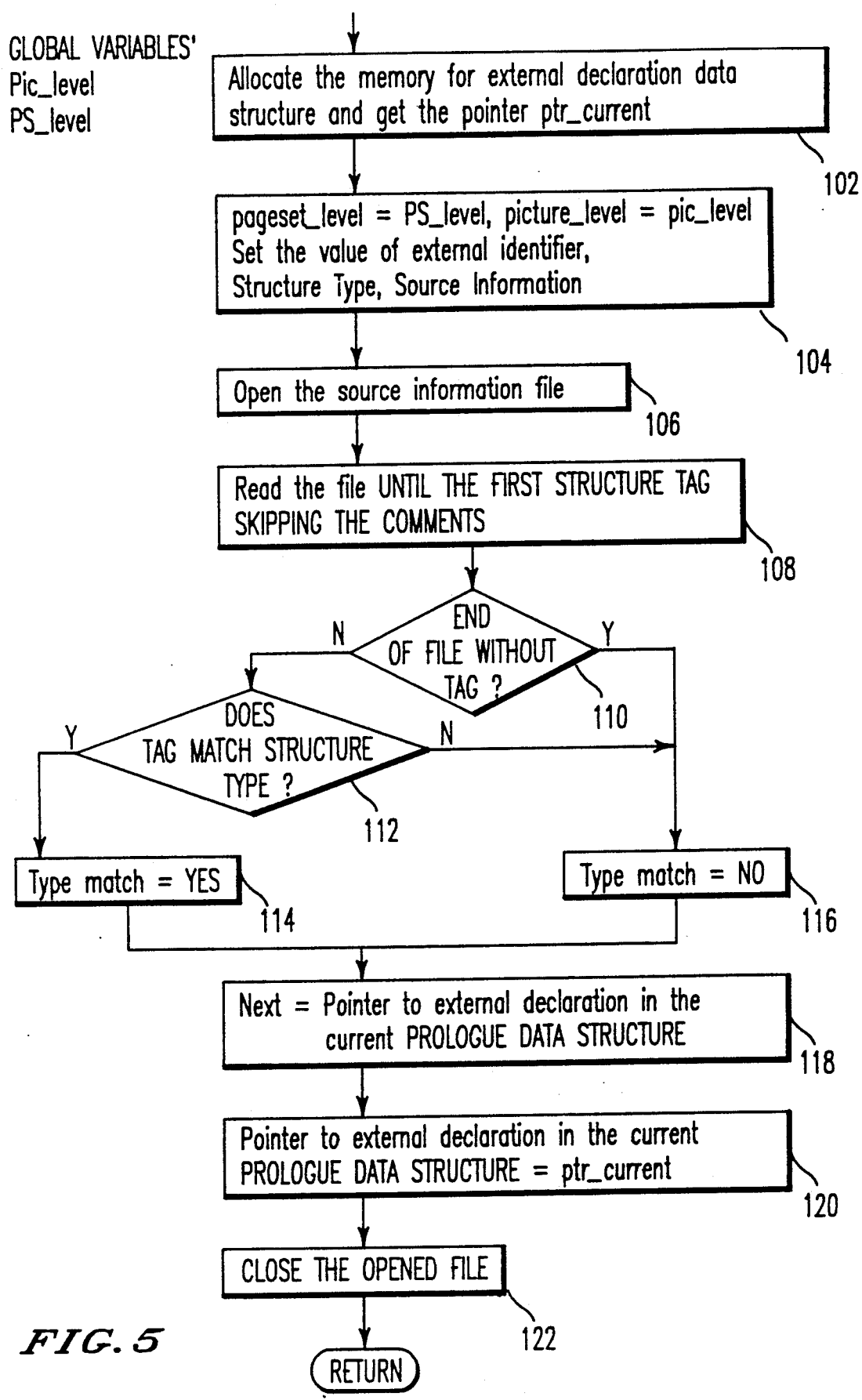
FIG. 5 is a flow chart illustrating processing steps of an external declaration processor according to this invention.

FIG. 5 illustrates the processing steps of the external declaration processor according to this invention. The external processing that occurs in FIG. 5 is important in that it provides a means by which external declarations can be "bound" to the input data document stream in a manner which allows for the inclusion of external declarations in an efficient manner. The general operation of the external declaration processor is described with respect to FIG. 5. At step 102 the external declaration processor allocates memory for an external declaration data structure and changes the pointer to the correct and new external declaration 102. At step 104, the pageset level, the picture level, the values of the external identifier, the structure type and the source information are set. At step 106, the information file which contains the source material for the new external definition is opened, and at step 108 this file is read until the "first structure tag" is hit. If the end of file tag is the first tag in step 110 the type match is set to "no" in step 116. In step 110, if the first tag that is hit in this opened file is not an end of file tag, then in step 112 a check of the tag type is done to determine if it matches the structure type. If not, step 116 is also executed. However, if in step 112 the type match does match, step 114 is executed and the type match is set to "yes". At this point the processing continues at step 118 to indicate that the next value is set to be equal to the point or to the external declaration in the current prologue data structure. This allows for the new declaration to be placed first in the hierarchy, and the pointer to the external declaration of the current prologue data structure is set equal to the ptr-current in step 120. In step 122 the external declaration is then closed and a return is issued thereby allowing the processing to continue. In other words, the external identifier comes from the <EXTID> tag; with the structure type coming from the structure attribute and source information coming from the <STRUCTID> tag if one were to process the example information.

Figure 6:
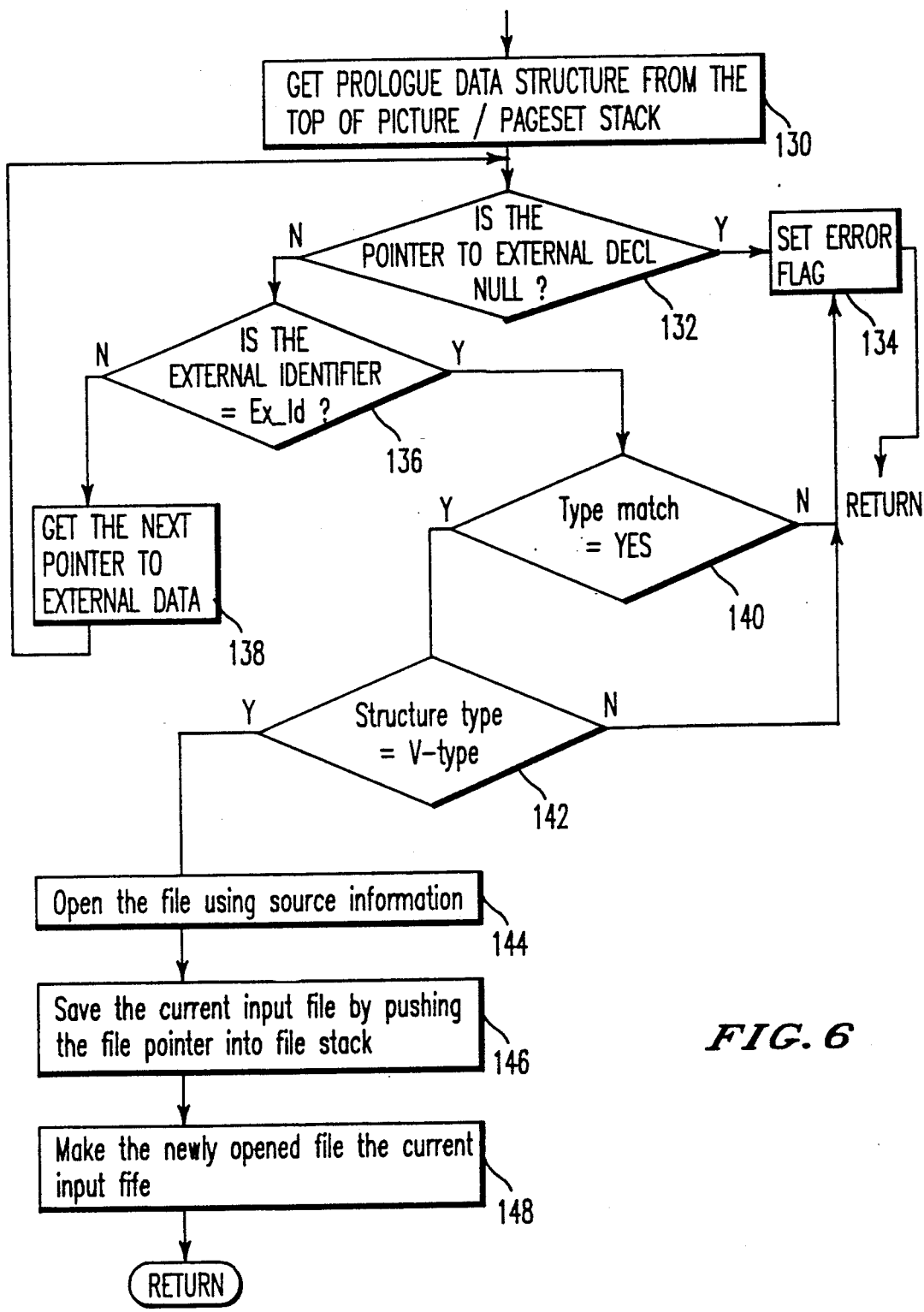
FIG. 6 is a flow chart illustrating processing steps of an external identifier processor according to this invention.

The external identifier processor shown in FIG. 4 operates as shown in FIG. 6. Globally the current input file and the input file stack are available to this processor and processing begins at step 130 where the prologue data structure is pointed by the top of the picture/pageset stack. In step 132 it is determined if the pointer to the external declaration is null. If so, an error occurs and the error flag is set in step 134. If however the pointer to the external declaration is not null, in step 136 the external identifier is checked to determine if it is equal to Ex_id. If it is not, in step 138 the next pointer is obtained and the processing returns to step 132 to determine if the external declaration is null. If on the other hand it is equal in step 136 processing moves to step 140 to determine if a match exists. If not, the error flag is set in step 134 and a return is issued. If it does match, the structure type is then compared with the valid structure type(s) in step 142 and if it is not determined to be correct the error flag is again set and a return is issued. If in step 142 the structure type is correct then in step 144 the external file is opened using the source information contained within the data variable which is pointed to by the pointer. In step 146 the current input file is saved by pushing a file pointer onto the file stack of the processor with this newly open file being made the current input file in step 148.

Figure 7:
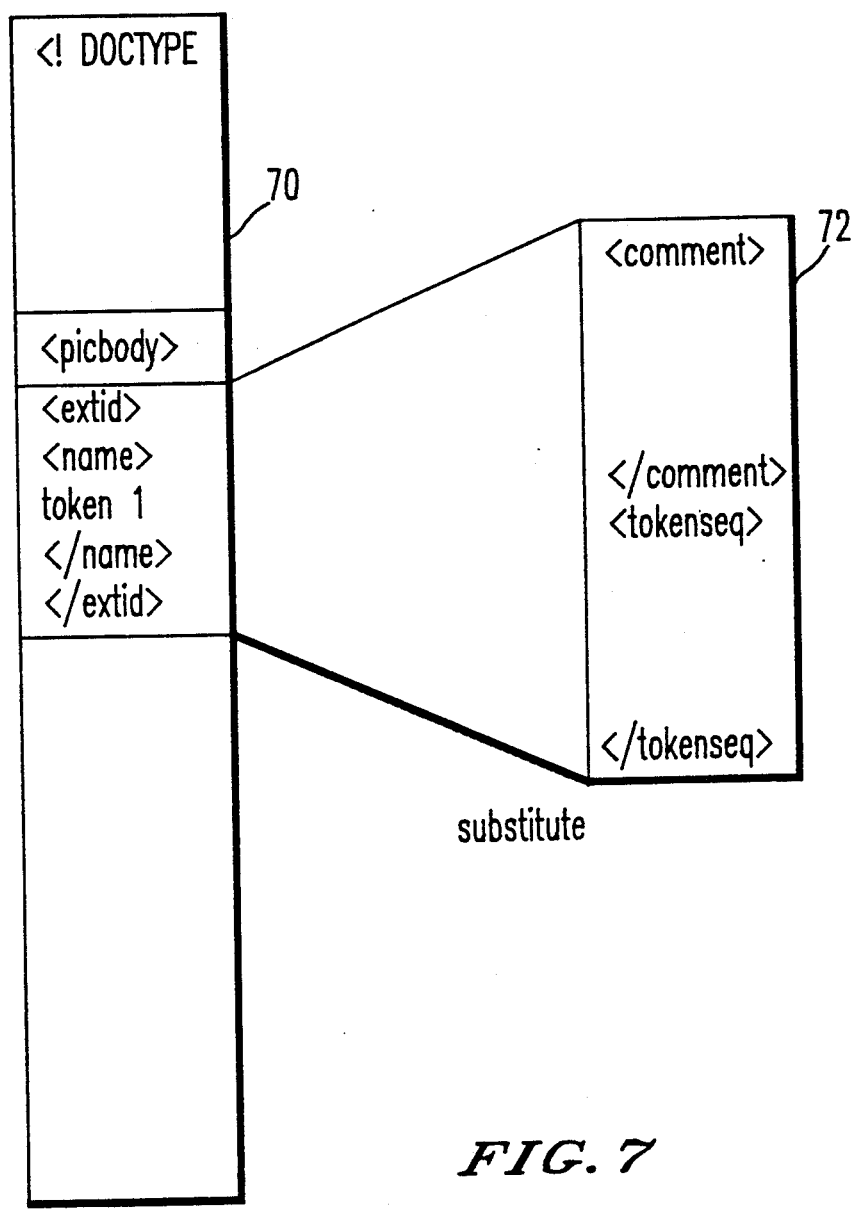
FIG. 7 is an illustration of the effects of substituting the external entity into a SPDL document stream.

The above described processing provides increased flexibility over prior art systems by allowing the external file to be included and to be made a new resource and allows for the inclusion of an external entity into the main body of the original document. An example of this is shown in FIG. 7 which substitutes the entire external entity 72 into an original document 70 by allowing for an inclusion of an external declaration into an individual page description language process. An important result of this substitution/inclusion is that the "name" or identification of the external entities may be the same (i.e. "header_file"), however based upon the context of where in the document data stream the call is made to the external entity the "correct" external entity will be found and employed by the structure processor. A correct attachment will always occur due to the pointer arrangement shown in FIG. 3. This further allows for an external document to contain new calls to yet another external document.

A feature that is enabled by this inclusion is that by changing one external document, for example, a new company logo can be placed on all documents which previously called for the "old" logo if the call was by way of external declarations. Another aspect allows for an increased use of shared resources, such as downloadable graphics, in a far easier manner. System wide standard changes or department wide changes are far easier to implement and control by virtue of this feature. The search order that comes about because of the pointer structure in FIG. 3 allows for global changes to be made with a correct attachment being insured.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for control of a presentation of a document by a presentation device, comprising:
   input means for accepting an input document data stream defining said document, said data stream composed of a picture having zero or more external references or a pageset having zero or more external references with a hierarchically ordered structure;
   said picture comprising zero or more prologue and zero or more picture body, and said pageset comprising zero or more prologue and zero or more pageset body;
   said picture body comprising zero or more tokensequences and zero or more pictures;
   said pageset body comprising zero or more pictures and zero or more pagesets;
   structure processing means coupled to said input means to determine pageset definitions or picture definitions to detect external references therein, for processing each prologue in the determined pageset or picture definitions, for ordering body portions between any detected external references in an ordered hierarchy, and for generating and outputting output document instructions for controlling said presentation device; and
   output means coupled to said structure processing means for applying said output document instructions to said presentation device.

2. An apparatus for a control of a presentation of a document by means of a presentation device, comprising:
   input means for accepting an input document data stream defining said document, wherein said data stream is in an ordered hierarchical structure comprising zero or more prologues, zero or more associated content portions, and zero or more references to external document data declarations;
   CPU means coupled to said input means for processing said data stream and producing output document instructions based on the processed data stream, comprising,
   means for ordering the addressing of said at least one prologue and associated content portions in an ordered hierarchy and for ordering the addressing of said external document data declarations in the same ordered hierarchy;
   means for processing said at least one prologue and associated content portions in said ordered hierarchy to produce said output document instructions; and
   output means coupled to said CPU means for applying said output document instructions to said presentation device for the presentation of the document represented by said output document instructions.

3. The apparatus according to claim 2, wherein said ordering means comprising:
   stack memory means for storing pointers allocating memory locations for storage of external document data declarations such that said stored pointers provide an ordered retrieving sequence.

4. An apparatus as in claim 2, further comprising:
   a content processor means operatively associated with said CPU means for processing the content of said inputted document data stream;
   a mass storage device coupled to said CPU means; and
   wherein said external document data declarations are stored within said mass storage device and read from said mass storage device under the control of said content processor means upon the encounter of a reference to said external document data declaration by said external declarations during a processing of said document data stream and said pointer references said external declarations references from said mass storage device.

5. An apparatus as in claim 4, further comprising:
   random access memory means coupled to said CPU means for holding said document data stream; and
   means for transferring from said mass storage device referenced external document data declarations stored therein and stored within said random access memory means upon their first encounter in the inputted document data stream by said content processor means; and
   means for removing from said random access memory means said transferred external data declarations upon the first occurrence of the exhausting of space within said random access memory means or upon the processing of a content element in the inputted document data stream that is of the same or higher level in the ordered hierarchical structure of said inputted document data stream.

6. An apparatus as in claim 2, wherein said document structure processing means further comprises:
a stack memory means coupled to said CPU means for controlling the scope of said external document data declarations.

7. An apparatus as in claim 6, wherein said stack memory means employs a pointer structure to maintain identification of said stored items such that the last external document data declaration is allocated to the first pointer in said stack.

8. An apparatus as in claim 7, further comprising:
means to store said pointers to allocated memory for said external document data declarations in said stack memory means in a linked list arrangement.

9. An apparatus as in claim 8, further comprising:
search means for searching said stack memory means such that the pointers to an external declaration that is at a lower level in the hierarchy of the inputted document data stream occurs prior to any other pointers at the same or higher level than any external declarations that have been encountered in the inputted document data stream such that any search occurs in a last in to first in arrangement.

10. In a method for controlling a presentation of a document defined by a document data stream, the improvement comprising the steps of:
(a) inputting to a processor unit a document data stream defining a document to be presented, said document data stream including pageset definitions, each pageset definition including a begin, zero or more picture elements and an end, said picture elements comprising zero or more prologues, each prologue comprising zero or more prologue elements, zero or more external data declarations and content portions, said content portions containing image defining tokensequence elements;
(b) parsing said inputted document data stream to determine the begin and end of a prologue within said inputted document data stream to determine the existence thereof and to determine the existence of any external data declarations;
(c) allocating memory at a given hierarchical level of memory allocation ordering and storing in the allocated memory at said given hierarchical level document data a reference to the location of an external data declaration associated with a given prologue section thereby associating said external data declaration with a given level of prologue such that upon any further reference to said given prologue the reference to said external declaration is bound thereto;
(d) pushing onto a stack a pointer identifying memory allocated at said given hierarchical level;
(e) allocating memory at a lower hierarchical level below the given hierarchical level and storing at said lower hierarchical level document data a reference to the location of an external data declaration associated with a given prologue section thereby associating said external declaration with a given level of prologue such that upon any further reference to said given prologue the reference to said external declaration is bound thereto; and
(f) pushing onto said stack a pointer identifying memory allocated at said lower hierarchical level.

11. A processor apparatus for control of presentation of a document defined by a document data stream, said processor programmed to perform the steps of:
(a) inputting to a processor unit a document data stream defining a document to be presented, said document data stream including pageset definitions, each pageset definition including a begin, zero or more picture elements and an end, said picture elements comprising zero or more prologues, each prologue comprising zero or more prologue elements, zero or more external data declarations and content portions, said content portions containing image defining tokensequence elements;
(b) parsing said inputted document data stream to determine the begin and end of a prologue within said inputted document data stream to determine the existence thereof and to determine the existence of any external data declarations;
(c) allocating memory at a given hierarchical level of memory allocation ordering and storing in the allocated memory at said given hierarchical level document data a reference to the location of an external data declaration associated with a given prologue section thereby associating said external data declaration with a given level of prologue such that upon any further reference to said given prologue the reference to said external declaration is bound thereto;
(d) pushing onto a stack a pointer identifying memory allocated at said given hierarchical level;
(e) allocating memory at a lower hierarchical level below the given hierarchical level and storing at said lower hierarchical level document data a reference to the location of an external data declaration associated with a given prologue section thereby associating said external declaration with a given level of prologue such that upon any further reference to said given prologue the reference to said external declaration is bound thereto; and
(f) pushing onto said stack a pointer identifying memory allocated at said lower hierarchical level.

12. A computer readable medium for storing a program for control of presentation of a document defined by a document data stream, said program defining the steps:
(a) inputting to a processor unit a document data stream defining a document to be presented, said document data stream including pageset definitions, each pageset definition including a begin, zero or more picture elements and an end, said picture elements comprising zero or more prologues, each prologue comprising zero or more prologue elements, zero or more external data declarations and content portions, said content portions containing image defining tokensequence elements;
(b) parsing said inputted document data stream to determine the begin and end of a prologue within said inputted document data stream to determine the existence thereof and to determine the existence of any external data declarations;
(c) allocating memory at a given hierarchical level of memory allocation ordering and storing in the allocated memory at said given hierarchical level document data a reference to the location of an external data declaration associated with a given prologue section thereby associating said external data declaration with a given level of prologue such that upon any further reference to said given prologue the reference to said external declaration is bound thereto;

(d) pushing onto a stack a pointer identifying memory allocated at said given hierarchical level;

(e) allocating memory at a lower hierarchical level below the given hierarchical level and storing at said lower hierarchical level document data a reference to the location of an external data declaration associated with a given prologue section thereby associating said external declaration with a given level of prologue such that upon any further reference to said given prologue the reference to said external declaration is bound thereto; and (f) pushing onto said stack a pointer identifying memory allocated at said lower hierarchical level.

13. A method for handling external declarations in a hierarchically structured page description language, comprising the steps of:

inputting a document data stream having an external declaration for defining an external entity which is initially undefined and used during a processing of the hierarchically structured page description language;

allocating a primary data structure for keeping track of parameters used for processing said input data stream;

allocating a first external declaration data structure having a reference to a definition of said external entity; and writing a reference to said first external declaration data structure in said primary data structure.

14. A method according to claim 13, further comprising the steps of:

inputting a second external declaration from the document data stream for defining a second external entity which is initially undefined and used during a processing of the hierarchically structured page description language;

allocating a second external declaration data structure having a reference to a definition of said second external declaration;

writing a reference to said first external declaration data structure in said second external declaration data structure;

writing a reference to said second external declaration data structure in said primary data structure; and processing said document data stream by searching for a definition of a predetermined external declaration using the reference to the second external declaration data structure in said primary data structure, and if said predetermined external declaration is not found, searching for the predetermined external declaration using the reference to the first external declaration data structure in said second external declaration data structure.

15. An apparatus for handling external declarations in a hierarchically structured page description language, comprising:

means for inputting a document data stream having an external declaration for defining an external entity which is initially undefined and used during a processing of the hierarchically structured page description language;

means for allocating a primary data structure for keeping track of parameters used for processing said input data stream;

means for allocating a first external declaration data structure having a reference to a definition of said external entity; and means for writing a reference to said first external declaration data structure in said primary data structure.

16. An apparatus according to claim 15, further comprising:

means for inputting a second external declaration from the document data stream for defining a second external entity which is initially undefined and used during a processing of the hierarchically structured page description language;

means for allocating a second external declaration data structure having a reference to a definition of said second external declaration;

means for writing a reference to said first external declaration data structure in said second external declaration data structure;

means for writing a reference to said second external declaration data structure in said primary data structure; and means for processing said document data stream by searching for a definition of a predetermined external declaration using the reference to the second external declaration data structure in said primary data structure, and if said predetermined external declaration is not found, searching for the predetermined external declaration using the reference to the first external declaration data structure in said second external declaration data structure.

* * * * *

UNITED STATES PATENT AND TRADEMARK OFFICE
CERTIFICATE OF CORRECTION

PATENT NO. : 5,325,484
DATED : June 28, 1994
INVENTOR(S) : Tetsuro MOTOYAMA

It is certified that error appears in the above-indentified patent and that said Letters Patent is hereby corrected as shown below:

On the title page, Item [75], the 1st name of the inventor should read as follows:

--Tetsuro--

Signed and Sealed this

Eighteenth Day of October, 1994

Attest:

BRUCE LEHMAN

*Attesting Officer*    *Commissioner of Patents and Trademarks*